(12) United States Patent
Kim et al.

(10) Patent No.: US 10,161,548 B2
(45) Date of Patent: Dec. 25, 2018

(54) PIPE COUPLER

(71) Applicant: Samsung Electronics Co., Ltd., Suwon-si, Gyeonggi-do (KR)

(72) Inventors: Jung-Jae Kim, Seoul (KR); Jong-Hoon Lee, Yongin-si (KR); Jung-Kook Hwang, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 252 days.

(21) Appl. No.: 15/187,946

(22) Filed: Jun. 21, 2016

(65) Prior Publication Data

US 2017/0130878 A1     May 11, 2017

(30) Foreign Application Priority Data

Nov. 5, 2015 (KR) .................. 10-2015-0154966

(51) Int. Cl.
*F16L 21/00* (2006.01)
*F16L 21/06* (2006.01)
*A47L 9/00* (2006.01)

(52) U.S. Cl.
CPC ............ *F16L 21/06* (2013.01); *A47L 9/00* (2013.01); *F16L 21/005* (2013.01)

(58) Field of Classification Search
CPC ......... F16L 37/02; F16L 21/06; F16L 21/002; F16L 21/005; F16L 21/08
USPC .................................................. 285/373, 419
See application file for complete search history.

(56) References Cited

U.S. PATENT DOCUMENTS

| | | | | | |
|---|---|---|---|---|---|
| 4,260,181 A | * | 4/1981 | Curtin | ............ | F16L 55/17 138/100 |
| 4,870,856 A | * | 10/1989 | Sharp | ............ | F16L 39/00 285/123.17 |
| 4,939,923 A | * | 7/1990 | Sharp | ............ | F16L 39/00 285/373 |
| 5,022,685 A | * | 6/1991 | Stiskin | ............ | B29C 65/58 138/166 |
| 5,462,312 A | * | 10/1995 | Carpenter | ............ | F16L 7/00 285/15 |
| 5,823,581 A | * | 10/1998 | Coppolo | ............ | F16L 25/12 285/373 |
| 6,247,500 B1 | * | 6/2001 | McMahon | ............ | F16L 9/22 138/157 |

(Continued)

FOREIGN PATENT DOCUMENTS

| KR | 10-0297114 B1 | 5/2001 |
|---|---|---|
| KR | 10-0998169 B1 | 12/2010 |

(Continued)

*Primary Examiner* — Aaron M Dunwoody
(74) *Attorney, Agent, or Firm* — Harness, Dickey & Pierce, P.L.C.

(57) ABSTRACT

A pipe coupler may include a first coupling member and a second coupling member. The first coupling member may be configured to hold a portion of a first pipe. The second coupling member may be configured to hold a portion of a second pipe coupled to the first pipe. The first coupling member and the second coupling member may be coupled to each other to connect the first pipe to the second pipe in a direction substantially perpendicular to a coaxis of the coupled first and second pipes. Thus, a leakage of the fluid through a combining portion between the first and second coupling members may be suppressed.

16 Claims, 10 Drawing Sheets

(56) References Cited

U.S. PATENT DOCUMENTS

| | | | | |
|---|---|---|---|---|
| 6,357,196 | B1* | 3/2002 | McCombs | E04C 3/14 |
| | | | | 138/166 |
| 6,431,216 | B1* | 8/2002 | Briscoe | F16L 55/17 |
| | | | | 138/110 |
| 7,261,324 | B2* | 8/2007 | Tisch | F16L 55/17 |
| | | | | 138/99 |
| 7,416,227 | B1* | 8/2008 | Earnest | F16L 55/1608 |
| | | | | 138/162 |
| 2004/0094958 | A1* | 5/2004 | Treverton | F16L 21/06 |
| | | | | 285/319 |
| 2006/0284413 | A1* | 12/2006 | Barrera | F16L 21/002 |
| | | | | 285/15 |
| 2007/0222217 | A1* | 9/2007 | Bennett | F16L 25/12 |
| | | | | 285/373 |
| 2014/0076420 | A1 | 3/2014 | Westermann | |
| 2014/0273578 | A1 | 9/2014 | Montena | |
| 2014/0284922 | A1 | 9/2014 | Lurk et al. | |
| 2014/0286512 | A1 | 9/2014 | Schmidt et al. | |
| 2014/0286710 | A1 | 9/2014 | Krohn et al. | |
| 2015/0081283 | A1 | 3/2015 | Peirce | |

FOREIGN PATENT DOCUMENTS

| | | |
|---|---|---|
| KR | 10-1008827 B1 | 1/2011 |
| KR | 10-1210235 B1 | 12/2012 |
| KR | 10-1231645 B1 | 2/2013 |

\* cited by examiner

PIPE COUPLER

CROSS-RELATED APPLICATION

This application claims priority under 35 USC § 119 to Korean Patent Application No. 10-2015-0154966, filed on Nov. 5, 2015 in the Korean Intellectual Property Office (KIPO), the contents of which are herein incorporated by reference in their entirety.

BACKGROUND

1. Field

Example embodiments relate to pipe couplers.

2. Description of the Related Art

Generally, a coupler is used to connect or coupling a first pipe and a second pipe with each other. The coupler may include a first coupling member configured to hold the first pipe, and a second coupling member configured to hold the second pipe.

According to related arts, the first coupling member and the second coupling member may be combined or clamped with each other in a coaxial direction of the first and second pipes. The coaxial direction may correspond to a stream direction of a fluid flowing through the first and second pipes. Thus, the fluid leaking through a combined portion between the first and second pipes may leak through a combined portion between the first and second coupling members.

SUMMARY

Some example embodiments provide pipe couplers that may be capable of preventing a leakage of a fluid.

According to an example embodiment, a pipe coupler includes a first coupling member and a second coupling member. The first coupling member may be configured to hold a portion of a first pipe. The second coupling member may be configured to hold a portion of a second pipe coupled with the first pipe. The first coupling member and the second coupling member may be coupled to each other to couple the first pipe to the second pipe in a direction substantially perpendicular to a coaxis of the coupled first and second pipes.

In some example embodiments, the first coupling member and the second coupling member each may have a semi-cylindrical shape.

In some example embodiments, the first coupling member may include a first combining groove and a first combining protrusion. The second coupling member may include a second combining protrusion inserted into the first combining groove along a circumferential direction with respect to the coaxis of the first and second pipes, and a second combining groove configured to receive the first combining protrusion along the circumferential direction.

In some example embodiments, the first combining groove may be formed at a first inner surface of the first coupling member along the circumferential direction. The first combining protrusion may protrude from a second inner surface of the first coupling member opposite to the first inner surface along the circumferential direction. The second combining protrusion may protrude from a second inner surface of the second coupling member facing the first inner surface of the first coupling member along the circumferential direction. The second combining groove may be formed at a first inner surface of the second coupling member facing the second inner surface of the first coupling member along the circumferential direction.

In some example embodiments, a first fixing groove may be formed at an inner surface of the first combining groove. A first fixing protrusion may be on a surface of the second combining protrusion and may be inserted into the first fixing groove may be formed on an outer surface of the first combining protrusion. A second fixing groove may be formed at an inner surface of the second combining groove. A second fixing protrusion may be on a surface of the first combining protrusion and may be inserted into the second fixing groove.

In some example embodiments, the first coupling member may include a first holder and a second holder. The first holder may include a first portion, the first portion configured to partially hold an outer surface of the first pipe. The second holder may include configured to partially hold an outer surface of the second pipe.

In some example embodiments, the first holder and the second holder each may have a semi-cylindrical inner wall, which is configured to make partial contact with the outer surfaces of the first and second pipes.

In some example embodiments, the first holder may further include a second portion extending from the first portion of the second holder and configured to hold the second pipe, and the second holder may further include a second portion extending from the first portion of the second holder and configured to hold the first pipe.

In some example embodiments, the first coupling member may include a first vacuum line, the vacuum line configured to supply vacuum to the first holder and closely hold the first holder with the outer surface of the first pipe. The second coupling member may include a second vacuum line, the second vacuum line configured to supply vacuum to the second holder and closely hold the second holder with the outer surface of the second pipe.

In some example embodiments, the first coupling member may further include a first valve installed at the first vacuum line. The second coupling member may further include a second valve installed at the second vacuum line.

According to an example embodiment, a pipe coupler includes a first coupling member, a second coupling member and a vacuum-supplying unit. The first coupling member may have a semi-cylindrical shape. The first coupling member may include a first holder, a first combining groove and a first combining protrusion. The first holder may include a first portion, which is configured to hold a portion of a first pipe. The second coupling member may have a semi-cylindrical shape. The second coupling member may include a second holder, a second combining protrusion and a second combining groove. The second holder may include a first portion, which is configured to hold a portion of a second pipe coupled with the first pipe. The second combining protrusion may be configured to be inserted into the first combining groove along a circumferential direction with respect to a coaxis of the first and second pipes. The second combining groove may be configured to receive the first combining protrusion along the circumferential direction. The vacuum-supplying unit may be configured to supply vacuum to the first and second holders.

In some example embodiments, the first combining groove may be formed at a first inner surface of the first coupling member along the circumferential direction. The first combining protrusion may protrudes from a second inner surface of the first coupling member along the circumferential direction, the second inner surface being opposite to the first inner surface. The second combining protrusion may protrude from a second inner surface of the second coupling member along the circumferential direction, the second coupling member facing the first inner surface of the first coupling member. The second combining groove may be formed at a first inner surface of the second coupling member along the circumferential direction, the first inner surface of the second coupling member facing the second inner surface of the first coupling member.

In some example embodiments, the first holder may further include a second portion extending from the first portion thereof in the coaxial direction, the second portion of the first holder configured to hold a portion of the second pipe. The second holder may further include a second portion extending from the first portion thereof in the coaxial direction, the second portion of the second holder configured to hold a portion of the first pipe.

In some example embodiments, the vacuum-supplying unit may include a first vacuum line formed in the first coupling member, and a second vacuum line formed in the second coupling member.

In some example embodiments, the vacuum-supplying unit may further include a first valve installed at the first vacuum line and a second valve installed at the second vacuum line.

According to an example embodiment, a pipe coupler may include a first coupling member having a first holder, a first protrusion on a first inner surface thereof, a first groove on a second inner surface thereof, the first holder including a first portion and a second portion, the first portion configured to partially hold an end portion of the first pipe, the second portion configured to partially hold an end portion of a second pipe, the end portion of the first pipe and the end portion of the second pipe facing each other, and a second coupling member having a second holder, a second protrusion on a first inner surface thereof, a second groove on a second inner surface thereof, the second holder including a first portion and a second portion, the first portion configured to partially hold the end portion of the second pipe, the second portion configured to partially hold the end portion of the first pipe, the first coupling member and the second coupling member configured to be coupled together and couple the first pipe and second pipe together by engaging the first and second grooves with the second and first protrusions, respectively, in a direction substantially perpendicular to a coaxis of the coupled first and second pipes.

In some example embodiments, when coupled, the first coupling member and the second coupling member may define a cylinder in which the first and second pipers are held.

In some example embodiments, at least one of the first protrusion and the second protrusion may include a fixing protrusion on a surface thereof, at least one of the first groove and the second groove may include a fixing groove on an inner surface thereof, and the fixing protrusion is configured to engage the fixing groove.

In some example embodiments, at least one of the first coupling member and the second coupling member may include a vacuum line connected to corresponding at least one of the first holder and the second holder.

In some example embodiments, the first coupling member may include a first sub coupling member and a second sub coupling member, the first sub coupling member including a first sub holder, a first sub protrusion on a first inner surface thereof, and a first sub groove on a second inner surface thereof, the second sub coupling member including a second sub holder, a second sub protrusion on a first inner surface thereof, and a second sub groove on a second inner surface thereof, and the first sub coupling member coupled to the second sub coupling member by engaging a first sub protrusion with the second sub groove at a connection point between the first sub coupling member and the second coupling member.

According to an example embodiment, the first coupling member and the second coupling member may be combined with each other along the direction substantially perpendicular to the coaxis of the first and second pipes. That is, the first coupling member and the second coupling member may be combined with each other along the direction substantially perpendicular to the stream direction of the fluid flowing through the first and second pipes. Thus, a leakage of the fluid through a combining portion between the first and second coupling members may be suppressed. Further, the first and second holders may be closely held by the vacuum so that the first and second holders make close or tight make with the outer surfaces of the first and second pipes. Therefore, a leakage of the fluid through a combining portion between the first and second pipes may be further suppressed.

BRIEF DESCRIPTION OF THE DRAWINGS

Example embodiments will be more clearly understood from the following detailed description taken in conjunction with the accompanying drawings.

FIG. 1 is an exploded perspective view illustrating a pipe coupler in accordance with an example embodiment;

FIG. 2 is a perspective view illustrating the pipe coupler in FIG. 1;

FIG. 3 is a cross-sectional view taken along line III-III' in FIG. 2;

FIG. 4 is a cross-sectional view taken along line IV-IV' in FIG. 2;

FIGS. 5 to 7 are cross-sectional views illustrating coupling operations of the coupler in FIG. 1;

FIG. 8 is an exploded perspective view illustrating a pipe coupler in accordance with an example embodiment;

FIG. 9 is a cross-sectional view illustrating the pipe coupler in FIG. 8;

FIG. 10 is an exploded perspective view illustrating a pipe coupler in accordance with an example embodiments and FIG. 11 is a cross-sectional view illustrating the pipe coupler in FIG. 10.

DETAILED DESCRIPTION

Figure 1:
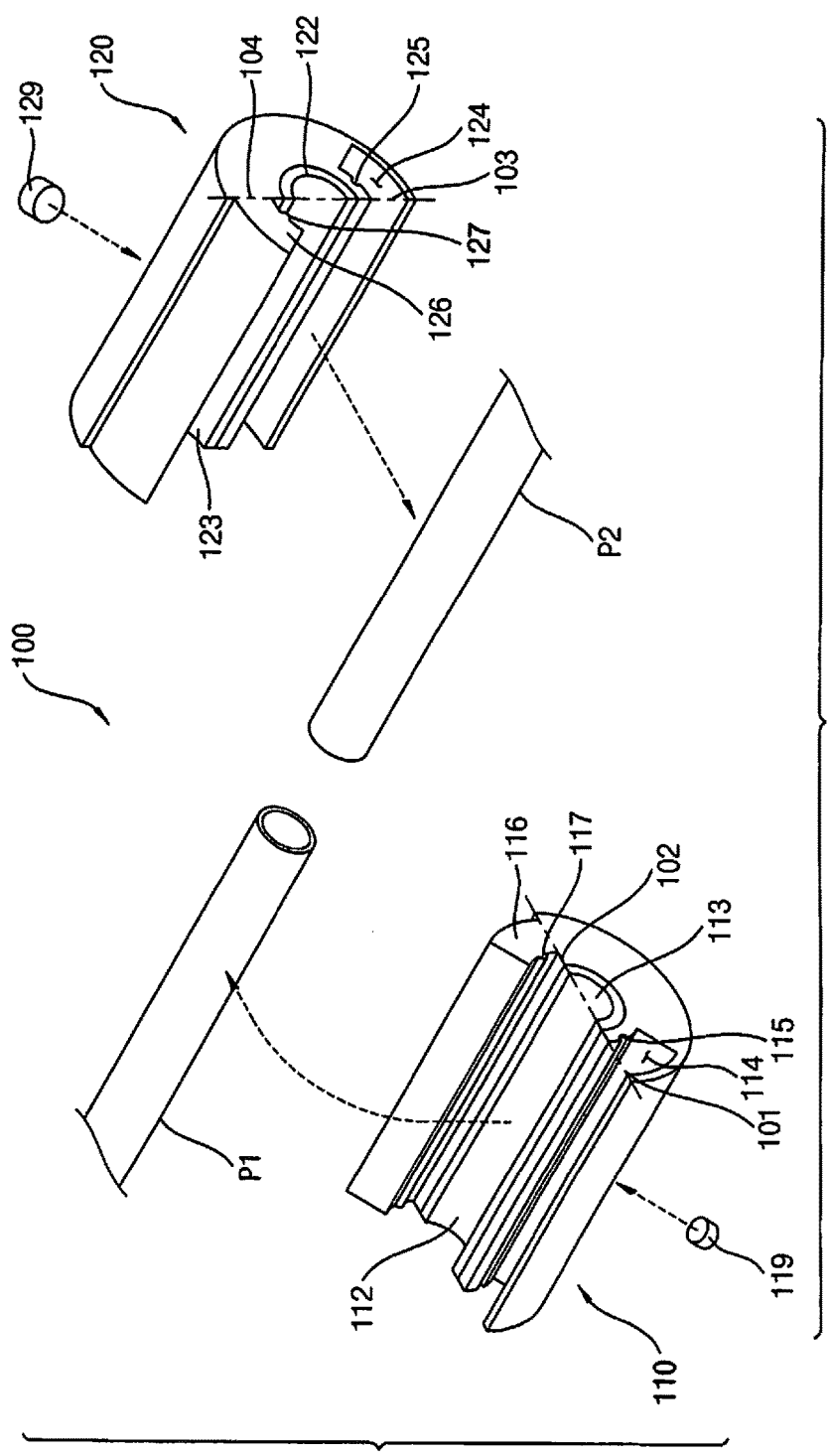
FIGS. 1 to 11 represent non-limiting, example embodiments as described herein.

Various example embodiments will be described more fully hereinafter with reference to the accompanying drawings, in which some example embodiments are shown. The present inventive concepts may, however, be embodied in many different forms and should not be construed as limited to the example embodiments set forth herein. Rather, these example embodiments are provided so that this disclosure will be thorough and complete, and will fully convey the scope of the present inventive concepts to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concepts.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, some example embodiments will be explained in detail with reference to the accompanying drawings.

Figure 2:
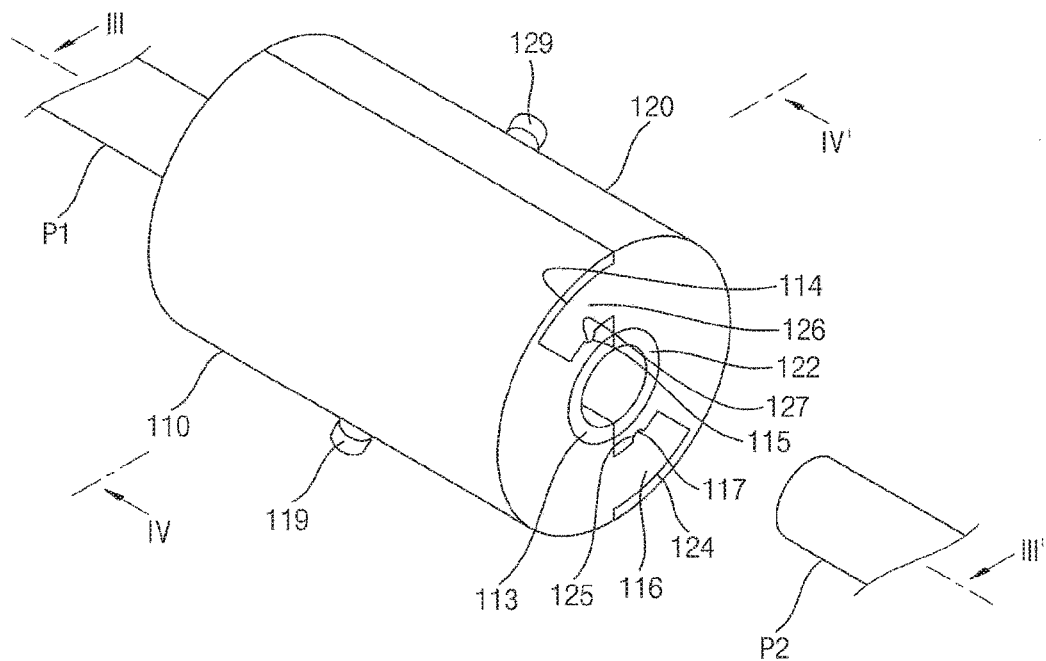
Figure 3:
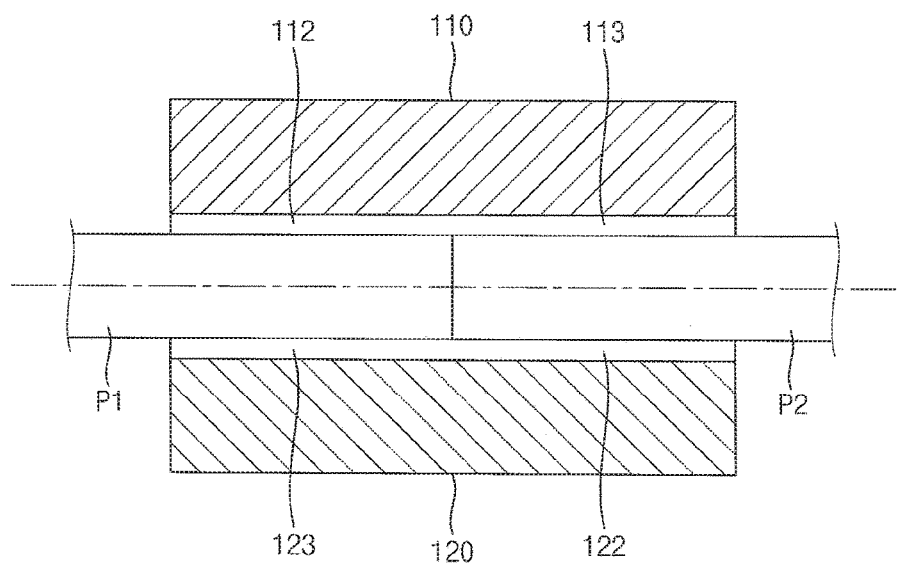
Figure 4:
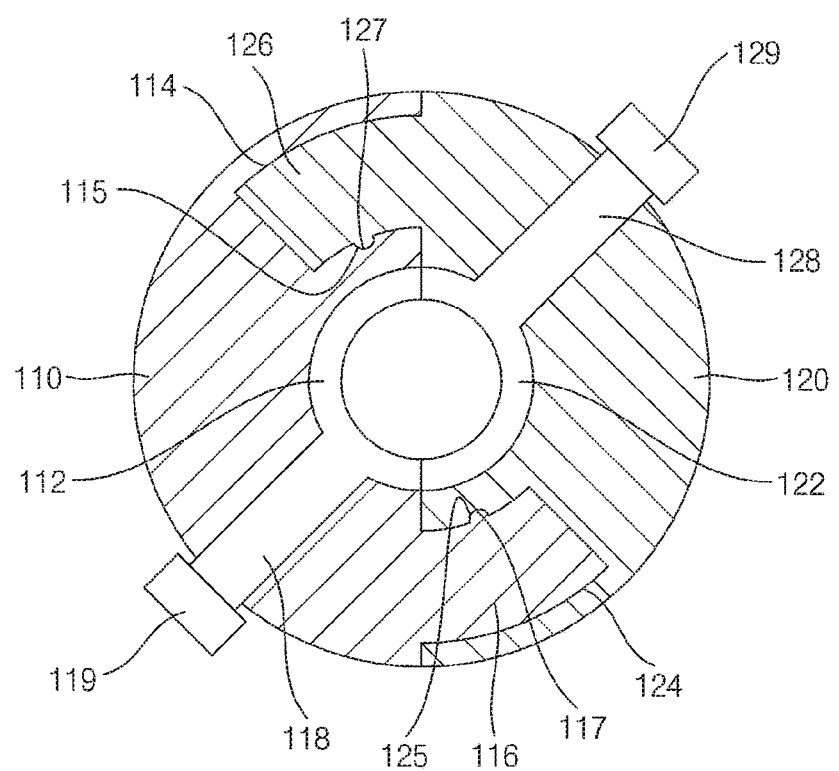

FIG. 1 is an exploded perspective view illustrating a pipe coupler in accordance with an example embodiment, FIG. 2 is a perspective view illustrating the pipe coupler in FIG. 1, FIG. 3 is a cross-sectional view taken along line III-III' in FIG. 2, and FIG. 4 is a cross-sectional view taken along line IV-IV' in FIG. 2.

Referring to FIGS. 1 to 4, a pipe coupler 100 of this example embodiment includes a first coupling member 110 and a second coupling member 120.

The first coupling member 110 may be configured to hold a first pipe P1. The first coupling member 110 may have a semi-cylindrical shape extending in an axial direction of the first pipe P1. The first coupling member 110 may include a flexible material such as plastic.

The semi-cylindrical shaped first coupling member 110 may include a first holder including a first portion 112 and a second portion 113. The first holder is provided at an inner surface of the first coupling member 110 . . . . The first portion 112 of the first holder may be configured to hold the first pipe P1. The first portion 112 of the first holder may have a semi-cylindrical shape. The first portion 112 of the first holder may have a cylindrical axis, which is substantially the same as a cylindrical axis of the first pipe P1. Thus, the first portion 112 of the first holder may hold, for example, a half portion of an outer surface of the first pipe P1. The first holder 112, 113 may have a hollow shape.

The inner surface of the first coupling member 110 may be divided into a first inner surface 101 and a second inner surface 102 by the first holder 112, 113. A first combining groove 114 may be formed on the first inner surface 101 of the first coupling member 110. The first combining groove 114 may extend in a circumferential direction with respect to the axial direction of the first pipe P1. Therefore, the first combining groove 114 may have a curvature substantially the same as a circumference line of the first coupling member 110.

A first combining protrusion 116 may be protruded from the second inner surface 102 of the first coupling member 110. The first combining protrusion 116 may be extended in the circumferential direction. Thus, the first combining protrusion 116 may have a curvature substantially the same as the circumference line of the first coupling member 110. The first combining protrusion 116 may have a size substantially the same as a size of the combining groove 114.

The second coupling member 120 may be configured to hold a second pipe P2. The second pipe P2 may be connected or coupled with the first pipe P1 by the pipe coupler 100. The second pipe P2 may have a diameter substantially the same as a diameter of the first pipe P1. Thus, the first pipe P1 and the second pipe P2 connected, coupled, or clamped by the pipe coupler 100 may have a coaxis.

The second coupling member 120 may have a semi-cylindrical shape extending in an axial direction of the second pipe P2. The second coupling member 120 may include a flexible material such as plastic. The semi-cylindrical shaped second coupling member 120 may have a size substantially the same as the size of the semi-cylindrical shaped first coupling member 110. Therefore, the first coupling member 110 and the second coupling member 120 may be combined or clamped with each other to form one cylindrical shape.

The second coupling member 120 may be combined or clamped with the first coupling member 110 along the circumferential direction. For example, the first coupling member 110 and the second coupling member 120 may be combined with each other in a direction substantially perpendicular to a stream direction of a fluid flowing through the first and second pipes P1 and P2 as illustrated in FIGS. 1 and 2. Thus, a leakage of the fluid through a combining portion between the first and second coupling members 110 and 120 may be suppressed.

The semi-cylindrical shaped second coupling member 120 may include a second holder including a first portion 122 and a second portion 123. The second holder 122, 123 is provided at an inner surface of the second coupling member 120. The inner surface of the second coupling member 120 may face the inner surface of the first coupling member 110. When the inner surface of the first coupling member 110 is coupled with the inner surface of the second coupling member 120, the coupled first and second coupling members 110 and 120 may have the cylindrical shape.

The second holder 122 may be configured to hold the second pipe P2. The second holder 122 may have a semi-cylindrical shape. The second holder 122 may have a cylindrical axis, which is substantially the same as a cylindrical axis of the second pipe P2. Thus, the second holder 122, 123 may hold a half portion of an outer surface of the second pipe P2. The second holder 122 may have a shape and a size substantially the same as the shape and the size of the first holder 112. Therefore, when the first portion 112 of the first holder is coupled to or combined with the first portion 122 of the second holder, the combined or coupled structure may have an annular shape cross section, which surrounds or covers entire outer surfaces of the first and second pipes P1 and P2. The second holder 122 may have a hollow shape.

The inner surface of the second coupling member 120 may be divided into a first inner surface 103 and a second inner surface 104 by the second holder 122, 123. The first inner surface 103 of the second coupling member 120 may face the second inner surface 102 of the first coupling member 110. The second inner surface 104 of the second coupling member 120 may face the first inner surface 101 of the first coupling member 110.

A second combining groove 124 may be formed on the first inner surface 102 of the second coupling member 120. The second combining groove 124 may be extended in a circumferential direction with respect to the axial direction of the second pipe P2. Therefore, the second combining groove 124 may have a curvature substantially the same as a circumference line of the second coupling member 120. Because the curvature of the first combining protrusion 116 of the first coupling member 110 is substantially the same as the curvature of the second combining groove 124 of the second coupling member 120, the first combining protrusion 116 may be rotated with respect to the cylindrical axis of the first and second pipes P1 and P2 so that the first combining protrusion 116 is inserted into the second combining groove 124.

A second combining protrusion 126 may be protruded from the second inner surface 104 of the second coupling member 120. The second combining protrusion 126 may extend in the circumferential direction. Thus, the second combining protrusion 126 may have a curvature substantially the same as the circumference line of the second coupling member 120. The second combining protrusion 126 may have a size substantially the same as a size of the second combining groove 124. Because the curvature of the second combining protrusion 126 of the second coupling member 120 is substantially the same as the curvature of the first combining groove 114 of the first coupling member 110, the second combining protrusion 126 may be rotated with respect to the cylindrical axis of the first and second pipes P1 and P2 so that the second combining protrusion 126 is inserted into the first combining groove 114.

The second portion 113 of the first holder may extend over an end of the first pipe P1. The second portion 123 of the second holder may extend over an end of the second pipe P2. The second portion 113 of the first holder may cover an end portion of the second pipe P2 that is not covered by the first portion 122 of the second holder. The second portion 123 of the second holder may cover an end portion of the first pipe P1 that is not covered by the first portion 112 of the first holder. The second portion 113 of the first holder and the second portion of the second holder may have a hollow shape when coupled to each other, and may be in fluidic communication with the empty inner space defined by the first portion 112 of the first holder and the first portion 122 of the second holder.

Thus, one lateral end of the first coupling member 110 may be defined by an end of the second portion 113 of the first holder. One lateral end of the second coupling member 120 may be defined by an end of the second portion 123 of the second holder. When combined or coupled with each other, the combined or coupled first and second coupling members 110 and 120 may have one cylindrical shape.

The first coupling member 110 may have the shape and the size substantially the same as the shape and the size of the second coupling member 120. Thus, the first and second coupling members 110 and 120 may be symmetrical with each other with respect to the cylindrical axis of the first and second pipes P1 and P2.

Further, a first fixing groove 115 may be formed on an inner surface of the first combining groove 114. A first fixing protrusion 117 may be formed on an outer surface of the first combining protrusion 116. A second fixing protrusion 127 may be formed on an outer surface of the second combining protrusion 126. The second fixing protrusion 127 may be inserted into the first fixing groove 115. A second fixing groove 125 may be formed on an inner surface of the second combining groove 124. The first fixing protrusion 117 may be inserted into the second fixing groove 125. Thus, the first fixing protrusion 117 and the second fixing protrusion 127 may be inserted into the second fixing groove 125 and the first fixing groove 115, respectively, to inhibit or prevent the combined or coupled first and second coupling members 110 and 120 from being disengaged when a force is applied to the first and second fixing protrusions 117 and 127.

The first fixing groove 115 and the second fixing groove 125 may be positioned at portions of the inner surfaces of the first and second combing grooves 114 and 124 that are adjacent to the cylindrical axis of the first and second coupling members 110 and 120. The first fixing groove 115 and the second fixing groove 125 may have a semi-circular shape cross section. In some example embodiments, the first fixing groove 115 and the second fixing groove 125 may be provided at different locations and/or may have different shapes.

The pipe coupler 100 may further include a vacuum-supplying unit. The vacuum-supplying unit may provide the first holder 112 and the second holder 122 with vacuum to closely or tightly hold the first holder 112 and the second holder 122. The closely or tightly-held first and second holders 112 and 122 may be closely coupled to the outer surfaces of the first and second pipes P1 and P2. Particularly, the closely or tightly-held first and second holders 112 and 122 may be closely coupled to the combined portion of the first and second pipes P1 and P2, and thus suppress the fluid in the first and second pipes P1 and P2 from being leaked.

The vacuum-supplying unit may include a first vacuum line 118, a first valve 119, a second vacuum line 128 and a second valve 129. A vacuum pump (now shown) may be connected to the first and second vacuum lines 118 and 128.

The first vacuum line 118 may be extended from the outer surface of the first coupling member 110 to, for example, the first portion 112 of the first holder. Further, the first vacuum line 118 may be connected to the second portion 113 of the first holder. The first valve 119 may be installed on the first vacuum line 118 to control flows of the vacuum.

The second vacuum line 128 may be extended from the outer surface of the second coupling member 120 to the first portion 122 of the second holder. Further, the second vacuum line 128 may be connected to the second portion 123 of the second holder. The second valve 129 may be installed on the second vacuum line 128 to control flows of the vacuum.

Figure 5:
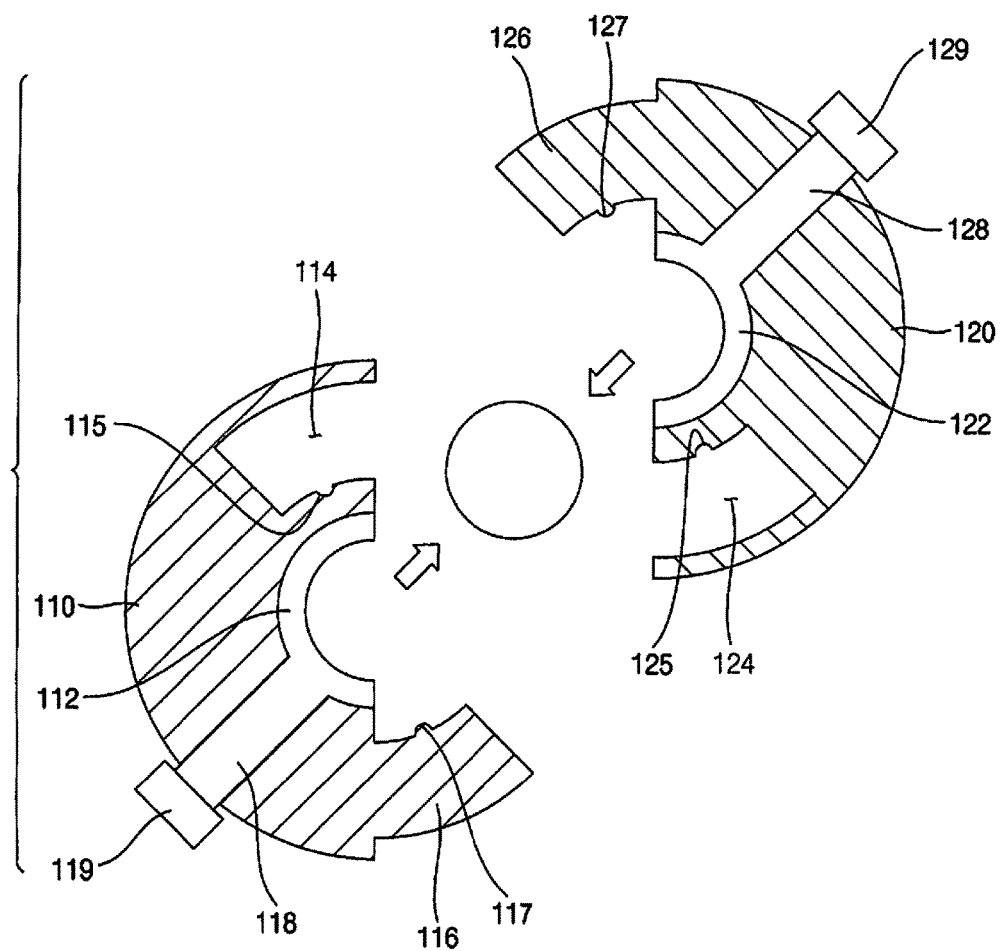
Figure 6:
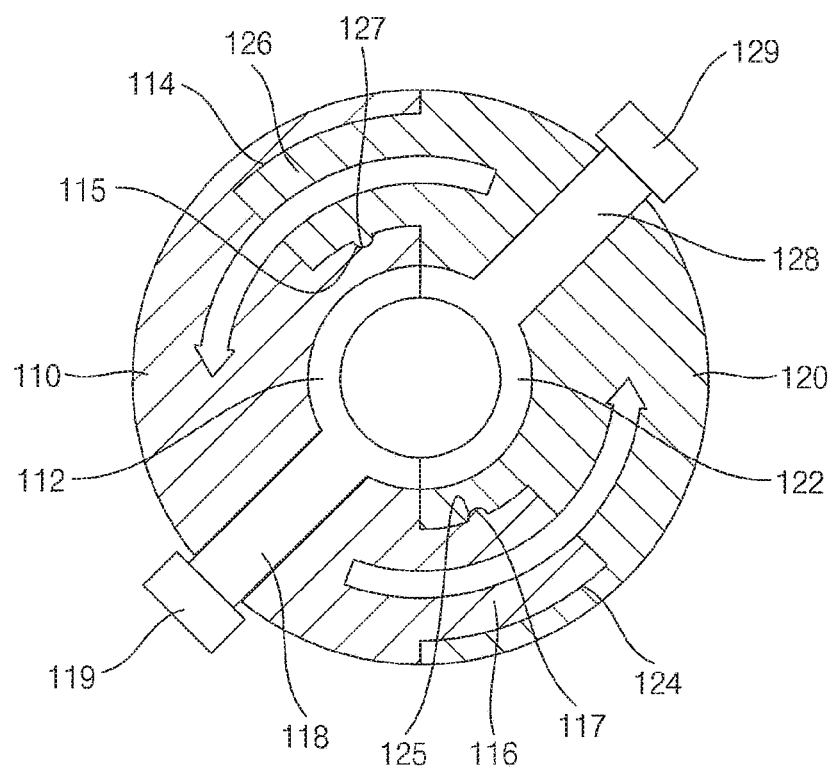
Figure 7:
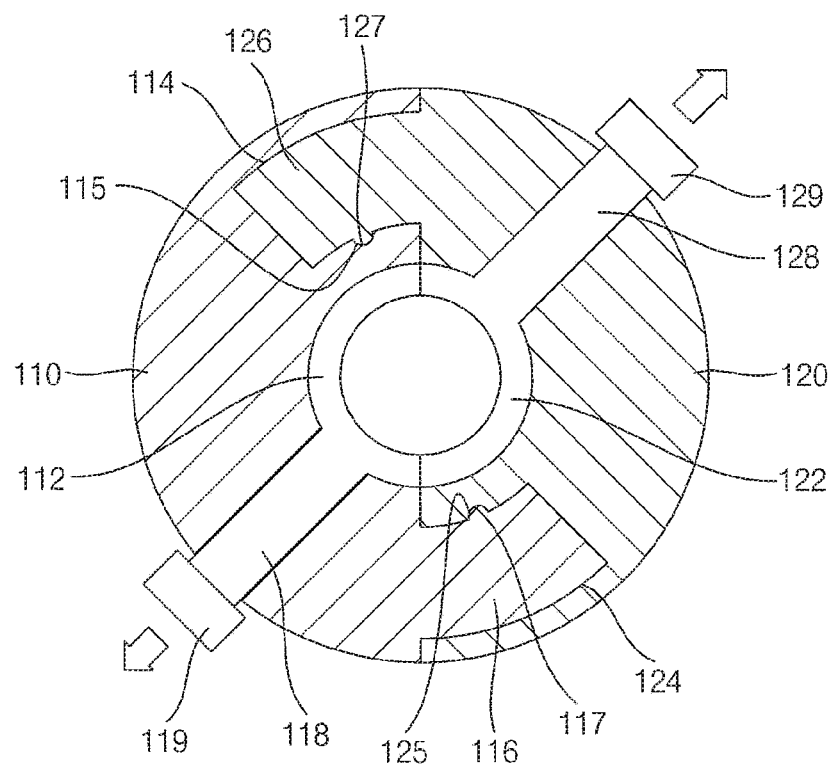

FIGS. 5 to 7 are cross-sectional views illustrating coupling operations of the coupler in FIG. 1.

Referring to FIG. 5, the first portion 112 of the first holder may hold a half portion of the outer surface of the first pipe P1. The first portion 122 of the second holder may hold a half portion of the outer surface of the second pipe P2. The first coupling member 110 may face the second coupling member 120.

Referring to FIG. 6, when the first coupling member 110 is couple to (or is combined with) the second coupling member 120, the first combining protrusion 116 may be inserted into the second combining groove 124 and the second combining protrusion 126 may be inserted into the first combining groove 114. The first fixing protrusion 117 may be inserted into the second fixing groove 125 and the second fixing protrusion 127 may be inserted into the first fixing groove 115. Further, the second portion 113 of the first holder may cover an end portion of the second pipe P2 that is not covered by the first portion 122 of the second holder. The second portion 123 of the second holder may cover an end portion of the first pipe P1 that is not covered by the first portion 112 of the first holder.

Referring to FIG. 7, the vacuum may be supplied to the first portion 112 of the first holder, the second portion 113 of the first holder, the first portion 122 of the second holder, and the second portion 123 of the second holder. Thus, the first portion 112 of the first holder, the second portion 113 of the first holder, the first portion 122 of the second holder, and the second portion 123 of the second holder may be closely or tightly held with the outer surfaces of the first and second pipes P1 and P2, for example, at the combined portion between the first and second pipes P1 and P2.

Figure 8:
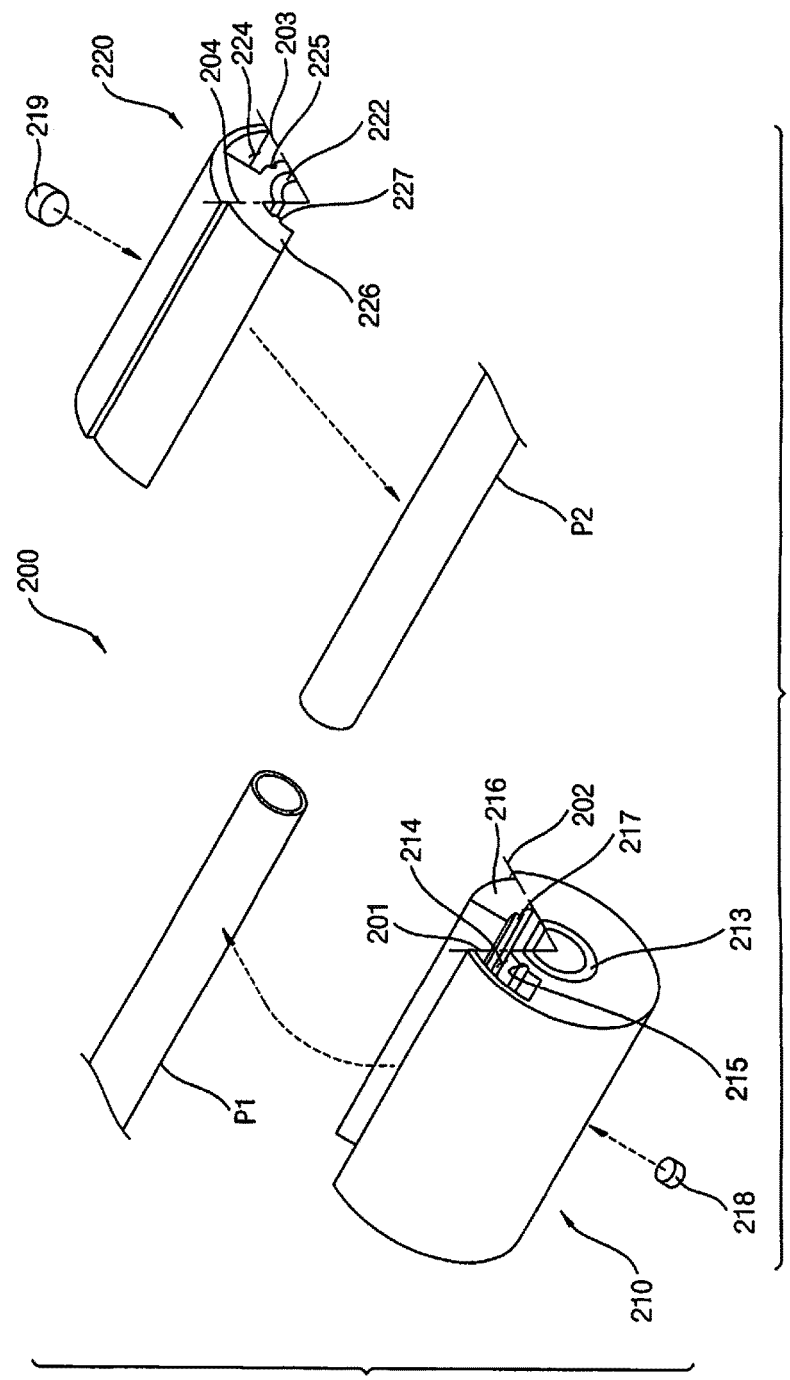
Figure 9:
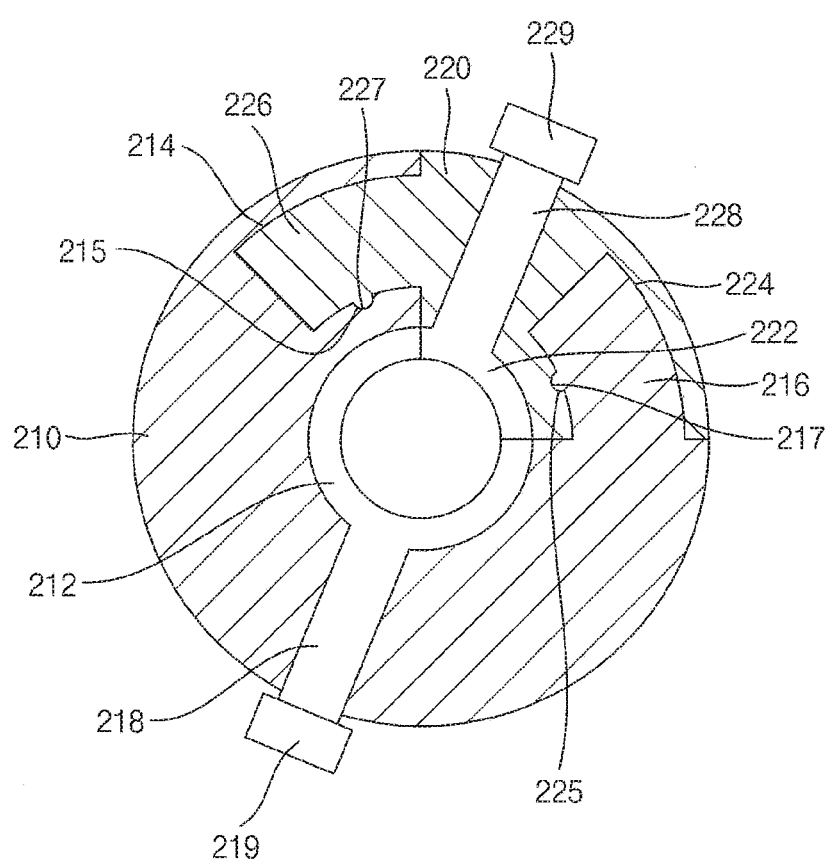

FIG. 8 is an exploded perspective view illustrating a pipe coupler in accordance with an example embodiment, and FIG. 9 is a cross-sectional view illustrating the pipe coupler in FIG. 8.

Referring to FIGS. 8 and 9, a pipe coupler 200 of this example embodiment may include a first coupling member 210 and a second coupling member 220.

The first coupling member 210 may be configured to hold a first pipe P1. The first coupling member 210 may have three quarters of a cylindrical shape extending in an axial direction of the first pipe P1. A first holder may include a first portion 212 and a second portion 213. The first portion 212 of the first holder may be provided at an inner surface of the first coupling member 210. The first portion 212 of the first holder may be configured to cover or hold the first pipe P1. The first portion 212 of the first holder may have three quarters of the cylindrical shape. Thus, the first holder 212 may cover or hold three quarters of an outer surface of the first pipe P1.

The first coupling member 210 may have a first inner surface 201 and a second inner surface 202 substantially perpendicular to each other. A first combining groove 214 may be formed on the first inner surface 201 of the first coupling member 210 along in a circumferential direction with respect to the axial direction of the first pipe P1.

A first combining protrusion 216 may be protruded from the second inner surface 202 of the first coupling member 210. The first combining protrusion 216 may be extended along the circumferential direction. The first combining protrusion 216 may have a size substantially the same as that of the first combining groove 214.

The second coupling member 220 may be configured to hold a second pipe P2. The second coupling member 220 may have a quarter of a cylindrical shape extending in an axial direction of the second pipe P2. The second coupling member 220 may have a radius substantially the same as a radius of the first coupling member 210. Thus, when the first coupling member 210 and the second coupling member 220 are combined with or coupled to each other, the combined or coupled first and second coupling members 210 and 220 may form one cylindrical shape.

A second holder may include a first portion 222 and a second portion 223. The first portion 222 of the second holder may be provided at an inner surface of the second coupling member 220. The first portion 222 of the second holder may be configured to cover or hold the second pipe P2. The first portion 222 of the second holder may have a quarter of the cylindrical shape. Thus, the first portion 222 of the second holder may cover or hold a quarter of an outer surface of the second pipe P2. Thus, when the first portion 212 of the first holder is coupled to or combined with the first portion 222 of the second holder, the coupled or combined structure may have an annular shape cross section, which covers or surrounds entire outer surfaces of the first and second pipes P1 and P2.

The second coupling member 220 may have a first inner surface 203 and a second inner surface 204 substantially perpendicular to each other. The first inner surface 203 of the second coupling member 220 may face the second inner surface 202 of the first coupling member 210. The second inner surface 204 of the second coupling member 220 may face the first inner surface 201 of the first coupling member 210.

A second combining groove 224 may be formed on the first inner surface 203 of the second coupling member 220 along in a circumferential direction with respect to the axial direction of the second pipe P2. Thus, when the first combining protrusion 216 rotates about the cylindrical axis of the first and second pipes P1 and P2, the first combining protrusion 216 may be inserted into the second combining groove 224.

A second combining protrusion 226 may be protruded from the second inner surface 204 of the second coupling member 220. The second combining protrusion 226 may extend along the circumferential direction. The second combining protrusion 226 may have a size substantially the same as that of the first combining groove 214. Thus, when the second combining protrusion 226 rotates about the cylindrical of the first and second pipes P1 and P2, the second combining protrusion 226 may be inserted into the first combining groove 214.

The second portion 213 of the first holder may extend over an end of the first pipe P1. The second portion 223 of the second holder may extend over an end of the second pipe P2. The second portion 213 of the first holder may cover three quarters of an end portion of the second pipe P2 that is not covered by the second holder 222. The second portion 223 of the second holder may cover a quarter of an end portion of the first pipe P1 that is not covered by the first portion 212 of the first holder.

Thus, one lateral end of the first coupling member 210 may be defined by an end of the second portion 213 of the first holder. One lateral end of the second coupling member 220 may be defined by an end of the second portion 223 of the second holder. The combined or coupled first and second coupling members 210 and 220 may have one cylindrical shape.

Further, a first fixing groove 215 may be formed on an inner surface of the first combining groove 214. A first fixing protrusion 217 may be formed on a surface of the first combining protrusion 216. A second fixing protrusion 227 may be formed on a surface of the second combining protrusion 226. The second fixing protrusion 227 may be inserted into the first fixing groove 215. A second fixing groove 225 may be formed on an inner surface of the second combining groove 224. The first fixing protrusion 217 may be inserted into the second fixing groove 225.

The pipe coupler 200 may further include a vacuum-supplying unit. The vacuum-supplying unit may include a first vacuum line 218, a first valve 219, a second vacuum line 228 and a second valve 229. A vacuum pump (not shown) may be connected to the first and second vacuum lines 218 and 228.

The first vacuum line 218 may be extended from the outer surface of the first coupling member 210 to, for example, the first portion 212 and the second portion 213 of the first holder. The first valve 219 may be installed on the first vacuum line 218 to control flows of the vacuum.

The second vacuum line 228 may be extended from the outer surface of the second coupling member 220 to, for example, the first portion 222 and the second portion 223 of the second holder. The second valve 229 may be installed on the second vacuum line 228 to control flows of the vacuum.

In some example embodiments, the pipe coupler may include the first and second coupling members having the same size. In some other example embodiments, the pipe coupler of a cylinder shape may include the first coupling member having a size of three quarters of the cylinder shape and the second coupling member having a size of a quarter of the cylinder shape. Sizes of the coupling members and/or the number of the coupling members are not restricted to the specific example embodiments disclosed herein. For example, the pipe coupler may include three or more coupling members, which are formed by dividing a cylinder into three or more portions.

Figure 10:
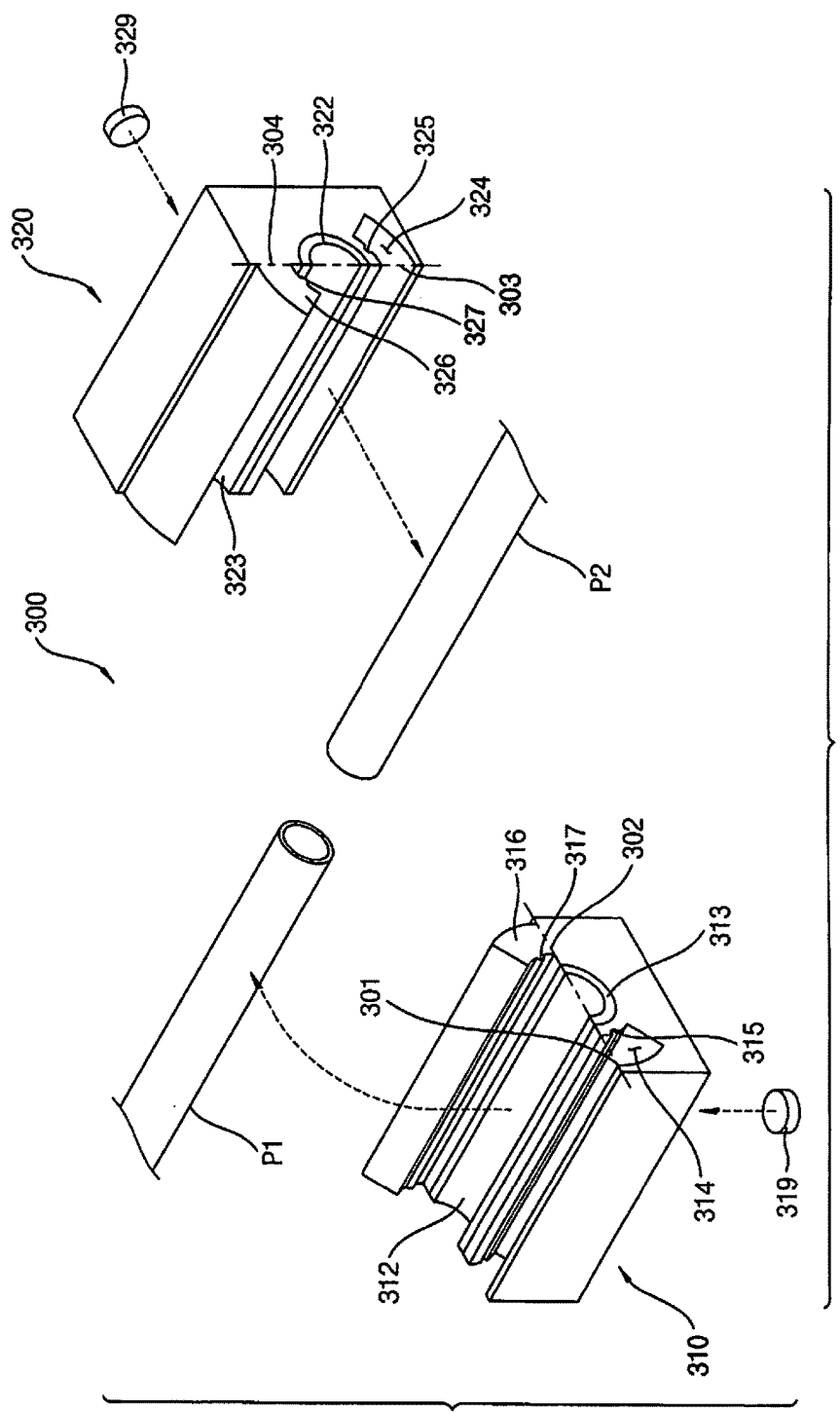
Figure 11:
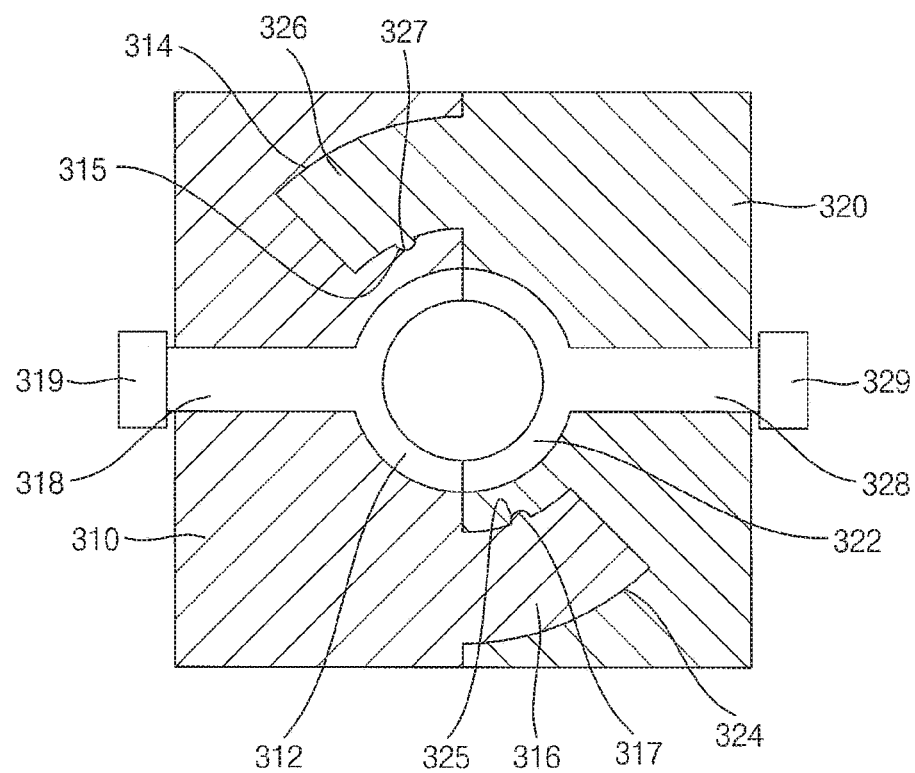

FIG. 10 is an exploded perspective view illustrating a pipe coupler in accordance with an example embodiment, and FIG. 11 is a cross-sectional view illustrating the pipe coupler in FIG. 10.

Referring to FIGS. 10 and 11, a pipe coupler 300 of this example embodiment may include a first coupling member 310 and a second coupling member 320.

The first coupling member 310 may be configured to hold or cover a first pipe P1. The first coupling member 310 may have a semi-rectangular parallelepiped shape extending in an axial direction of the first pipe P1.

A first holder may include a first portion 312 and a second portion 313. The first portion 312 of the first holder may be formed on a central portion of an inner surface of the first coupling member 310. The first portion 312 of the first holder may be configured to hold or cover the first pipe P1. The first portion 312 of the first holder may have a cylindrical axis substantially the same as that of the first pipe P1. Thus, the first portion 312 of the first holder may be configured to hold or cover a half of an outer surface of the first pipe P1.

An inner surface of the first coupling member 310 may be divided into a first inner surface 301 and a second inner surface 302 by the first holder 312. A first combining groove 314 may be formed on the first inner surface 301 of the first coupling member 310 along in a circumferential direction with respect to the axial direction of the first pipe P1.

A first combining protrusion 316 may be protruded from the second inner surface 302 of the first coupling member 310. The first combining protrusion 316 may extend along the circumferential direction. The first combining protrusion 316 may have a size substantially the same as that of the first combining groove 314.

The second coupling member 320 may be configured to hold or cover a second pipe P2. The second coupling member 320 may have a semi-parallelepiped shape extending in an axial direction of the second pipe P2. The second coupling member 320 may have a size substantially the same as a size of the first coupling member 310. Thus, when the first coupling member 310 and the second coupling member 320 are coupled to or combined with each other, the coupled or combined first and second coupling members 310 and 320 may form one rectangular parallelepiped shape.

The second coupling member 320 may have an inner surface, which is configured to surround the cylindrical axis of the second coupling member 320. The inner surface of the second coupling member 320 may face the inner surface of the first coupling member 310. When the inner surface of the first coupling member 310 is coupled to or combined with the inner surface of the second coupling member 320, the coupled or combined first and second coupling members 310 and 320 may form one rectangular parallelepiped shape.

The second holder may include a first portion 322 and a second portion 323. The first portion 322 of the second holder may be formed on a central portion of an inner surface of the second coupling member 320. The first portion 322 of the second holder may be configured to hold or cover the second pipe P2. The first portion 322 of the second holder may have a semi-rectangular parallelepiped shape. The first portion 322 of the second holder may have a cylindrical axis substantially the same as that of the second pipe P2. Thus, the first portion 322 of the second holder may hold or cover a half of an outer surface of the second pipe P2. The first portion 322 of the second holder may have a shape and a size substantially the same as those of the first portion 312 of the first holder. Therefore, when the first portion 312 of the first holder is coupled to or combined with the first portion 322 of the second holder, the coupled or combined structure may form one annular shape cross section, which surrounds or covers entire outer surfaces of the first and second pipes P1 and P2.

An inner surface of the second coupling member 320 may be divided into a first inner surface 303 and a second inner surface 304 by the second holder. The first inner surface 303 of the second coupling member 320 may face the second inner surface 302 of the first coupling member 310. The second inner surface 304 of the second coupling member 320 may face the first inner surface 301 of the first coupling member 310.

A second combining groove 324 may be formed on the first inner surface 303 of the second coupling member 320. The second combining groove 324 may extend along a direction substantially perpendicular to the axial direction of the second pipe P2.

A second combining protrusion 326 may be protruded from the second inner surface 304 of the second coupling member 320. The second combining protrusion 326 may extend along a direction substantially perpendicular to the axial direction of the second pipe P2. The second combining protrusion 326 may have a size substantially the same as that of the second combining groove 324.

The second portion 313 of the first holder may extend over an end of the first pipe P1. The second portion 323 of the second holder may extend over an end of the second pipe P2. The first portion 313 of the first holder may cover three quarters of an end portion of the second pipe P2 that is not covered by the first portion 322 of the second holder. The second portion 323 of the second holder may cover a quarter of an end portion of the first pipe P1 that is not covered by the first portion 312 of the first holder.

Thus, one lateral end of the first coupling member 310 may be defined by an end of the second portion 313 of the first holder. One lateral end of the second coupling member 320 may be defined by an end of the second portion 323 of the second holder. Thus, the coupled or combined first and second coupling members 310 and 320 may have one cylindrical shape.

Further, a first fixing groove 315 may be formed on an inner surface of the first combining groove 314. A first fixing protrusion 317 may be formed on a surface of the first combining protrusion 316. A second fixing protrusion 327 may be formed on a surface of the second combining protrusion 326. The second fixing protrusion 327 may be inserted into the first fixing groove 315. A second fixing groove 325 may be formed on an inner surface of the second combining groove 324. The first fixing protrusion 317 may be inserted into the second fixing groove 325.

The pipe coupler 300 may further include a vacuum-supplying unit. The vacuum-supplying unit may include a first vacuum line 318, a first valve 319, a second vacuum line 328 and a second valve 329. A vacuum pump (not shown) may be connected to the first and second vacuum lines 318 and 328.

The first vacuum line 318 may be extended from the outer surface of the first coupling member 310 to, for example, the first portion 312 and the second portion 313 of the first holder. The first valve 319 may be installed on the first vacuum line 218 to control flows of the vacuum.

The second vacuum line 328 may be extended from the outer surface of the second coupling member 320 to, for example, the first portion 322 and the second portion 323 of the second holder. The second valve 329 may be installed on the second vacuum line 328 to control flows of the vacuum.

According to some example embodiments, the first coupling member and the second coupling member may be combined with each other along the direction substantially perpendicular to the coaxis of the first and second pipes. That is, the first coupling member and the second coupling member may be combined with each other along the direction substantially perpendicular to the stream direction of the fluid flowing through the first and second pipes. Thus, a leakage of the fluid through a combining portion between the first and second coupling members may be suppressed. Further, the first and second holders may be closely or more tightly held by vacuum so that the first and second holders make close or tight contact with the outer surfaces of the first and second pipes. Therefore, a leakage of the fluid through a combining portion between the first and second pipes may be further suppressed.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims. In the claims, means-plus-function clauses are intended to cover the structures described herein as performing the recited function and not only structural equivalents but also equivalent structures.

What is claimed is:

1. A pipe coupler comprising:
    a first coupling member configured to hold a portion of a first pipe, the first coupling member including a first holder and a first vacuum line, the first holder including a first portion that is configured to partially hold an outer surface of the first pipe, the first vacuum line configured to supply vacuum to the first holder and hold an outer surface of the first pipe; and
    a second coupling member configured to hold a portion of a second pipe, the second coupling member including a second holder and a second vacuum line, the second holder including a first portion that is configured to partially hold an outer surface of the second pipe, the second vacuum line configured to supply vacuum to the second holder and hold an outer surface of the second pipe, the second pipe coupled with the first pipe, the first coupling member and the second coupling member configured to be coupled to each other to couple the first pipe to the second pipe in a direction substantially perpendicular to a coaxis of the coupled first and second pipes,
    wherein the first holder and the second holder each have a semi-cylindrical inner wall, the inner wall configured to make partial contact with the outer surfaces of the first and second pipes.

2. The pipe coupler of claim 1, wherein the first coupling member and the second coupling member each have a semi-cylindrical shape.

3. The pipe coupler of claim 2, wherein
the first coupling member includes a first combining groove and a first combining protrusion,
the second coupling member includes a second combining protrusion and a second combining groove,
the second combining protrusion is inserted into the first combining groove along a circumferential direction with respect to the coaxis of the first and second pipes, and
the second combining groove configured to receive the first combining protrusion along the circumferential direction.

4. The pipe coupler of claim 3, wherein
the first combining groove is on a first inner surface of the first coupling member along the circumferential direction,
the first combining protrusion protrudes from a second inner surface of the first coupling member opposite to the first inner surface along the circumferential direction,
the second combining protrusion protrudes from a second inner surface of the second coupling member facing the first inner surface of the first coupling member, and
the second combining groove is on a first inner surface of the second coupling member facing the second inner surface of the first coupling member.

5. The pipe coupler of claim 3, wherein
a first fixing groove is on an inner surface of the first combining groove,
a first fixing protrusion is on a surface of the second combining protrusion and is inserted into the first fixing groove,
a second fixing groove is on an inner surface of the second combining groove, and
a second fixing protrusion is on a surface of the first combining protrusion and is inserted into the second fixing groove.

6. The pipe coupler of claim 1, wherein
the first holder further includes a second portion extending from the first portion of the second holder and configured to hold the second pipe, and
the second holder further includes a second portion extending from the first portion of the second holder and configured to hold the first pipe.

7. The pipe coupler of claim 1, wherein
the first coupling member further includes a first valve on the first vacuum line and
the second coupling member further includes a second valve on the second vacuum line.

8. A pipe coupler comprising:
a semi-cylindrical first coupling member including a first holder, a first combining groove, and a first combining protrusion, the first holder including a first portion configured to hold a portion of a first pipe;
a semi-cylindrical second coupling member including a second holder, a second combining protrusion, and a second combining groove, the second holder including a first portion configured to hold a portion of a second pipe, the second pipe coupled with the first pipe, the second combining protrusion configured to be inserted into the first combining groove along a circumferential direction with respect to an coaxial direction of the first and second pipes, the second combining groove configured to receive the first combining protrusion along the circumferential direction; and
a vacuum-supplying unit configured to supply vacuum to the first and second holders.

9. The pipe coupler of claim 8, wherein
the first combining groove is on a first inner surface of the first coupling member along the circumferential direction,
the first combining protrusion protrudes from a second inner surface of the first coupling member along the circumferential direction, the second inner surface being opposite to the first inner surface,
the second combining protrusion protrudes from a second inner surface of the second coupling member, the second inner surface of the second coupling member facing the first inner surface of the first coupling member, and
the second combining groove is on a first inner surface of the second coupling member, the first inner surface of the second coupling member facing the second inner surface of the first coupling member.

10. The pipe coupler of claim 8, wherein
the first holder further includes a second portion extending from the first portion thereof in the coaxial direction, the second portion of the first holder configured to hold a portion of the second pipe, and
the second holder further includes a second portion extending from the first portion thereof in the coaxial direction, the second portion of the second holder configured to hold a portion of the first pipe.

11. The pipe coupler of claim 8, wherein the vacuum-supplying unit comprises:
a first vacuum line in the first coupling member and connected to the first holder; and
a second vacuum line in the second coupling member and connected to the second holder.

12. The pipe coupler of claim 11, wherein the vacuum-supplying unit further comprises:
a first valve on the first vacuum line; and
a second valve on the second vacuum line.

13. A pipe coupler comprising:
a first coupling member including a first holder, a first protrusion on a first inner surface thereof, a first groove on a second inner surface thereof, the first holder including a first portion and a second portion, the first portion configured to partially hold an end portion of a first pipe, the second portion configured to partially hold an end portion of a second pipe, the end portion of the first pipe and the end portion of the second pipe facing each other; and
a second coupling member including a second holder, a second protrusion on a first inner surface thereof, a second groove on a second inner surface thereof, the second holder including a first portion and a second portion, the first portion configured to partially hold the end portion of the second pipe, the second portion configured to partially hold the end portion of the first pipe, the first coupling member and the second coupling member configured to be coupled together and couple the first pipe and second pipe together by engaging the first and second grooves with the second and first protrusions, respectively, in a direction substantially perpendicular to a coaxis of the coupled first and second pipes,
wherein at least one of the first coupling member and the second coupling member includes a vacuum line connected to corresponding at least one of the first holder and the second holder.

14. The pipe coupler of claim 13, wherein when coupled, the first coupling member and the second coupling member define a cylinder in which the first and second pipes are held.

15. The pipe coupler of claim 13, wherein
at least one of the first protrusion and the second protrusion include a fixing protrusion on a surface thereof,
at least one of the first groove and the second groove include a fixing groove on a inner surface thereof, and
the fixing protrusion is configured to engage the fixing groove.

16. The pipe coupler of claim 13, wherein
the first coupling member includes a first sub coupling member and a second sub coupling member,
the first sub coupling member including a first sub holder, a first sub protrusion on a first inner surface thereof, and a first sub groove on a second inner surface thereof,
the second sub coupling member including a second sub holder, a second sub protrusion on a first inner surface thereof, and a second sub groove on a second inner surface thereof, and
the first sub coupling member coupled to the second sub coupling member by engaging a first sub protrusion with the second sub groove at a connection point between the first sub coupling member and the second coupling member.

\* \* \* \* \*